** United States Patent [19]

Denzlingen

[11] Patent Number: 4,882,523
[45] Date of Patent: Nov. 21, 1989

[54] DIRECT CURRENT MOTOR COMMUTATION CONTROL

[75] Inventor: Mahr P. Denzlingen, Denslingen, Fed. Rep. of Germany

[73] Assignee: Deutsche Thomson-Brandt GmbH, Villingen-Schwenningen, Fed. Rep. of Germany

[21] Appl. No.: 217,401

[22] Filed: Jul. 11, 1988

[30] Foreign Application Priority Data

Jul. 28, 1987 [DE] Fed. Rep. of Germany ....... 3724895

[51] Int. Cl.⁴ ............................................ H02K 29/14
[52] U.S. Cl. ..................................... 318/254; 318/138
[58] Field of Search ........................ 318/138, 254, 439

[56] References Cited

U.S. PATENT DOCUMENTS 4,151,449  4/1979  Takahashi ........................... 318/138
4,692,674  9/1987  Packard et al. ................. 318/138 X
4,700,115 10/1987  Gleim et al. ......................... 318/254

Primary Examiner—Bentsu Ro
Attorney, Agent, or Firm—Spensley Horn Jubas & Lubitz

[57] ABSTRACT

A method and circuit arrangement for controlling the commutation of coil sets of a direct current motor with a fixed sensor, in which a sensor signal (S1) having a first period (T1) related to the speed of rotation of the motor rotor is generated during each revolution of the rotor, including the steps of: producing a control signal having a period equal to the sum of the first period (T1) and a second period (T2) proportional to the first period (T1); and at the end of the period of the control signal, starting commutation of a first one of the coil sets.

14 Claims, 3 Drawing Sheets

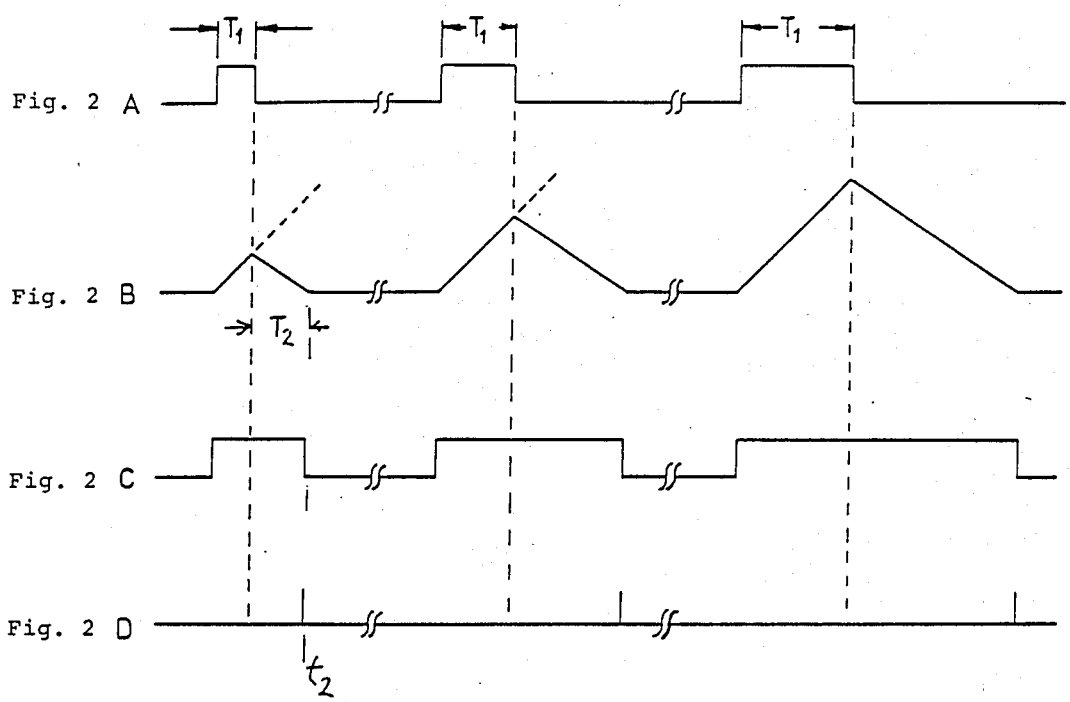
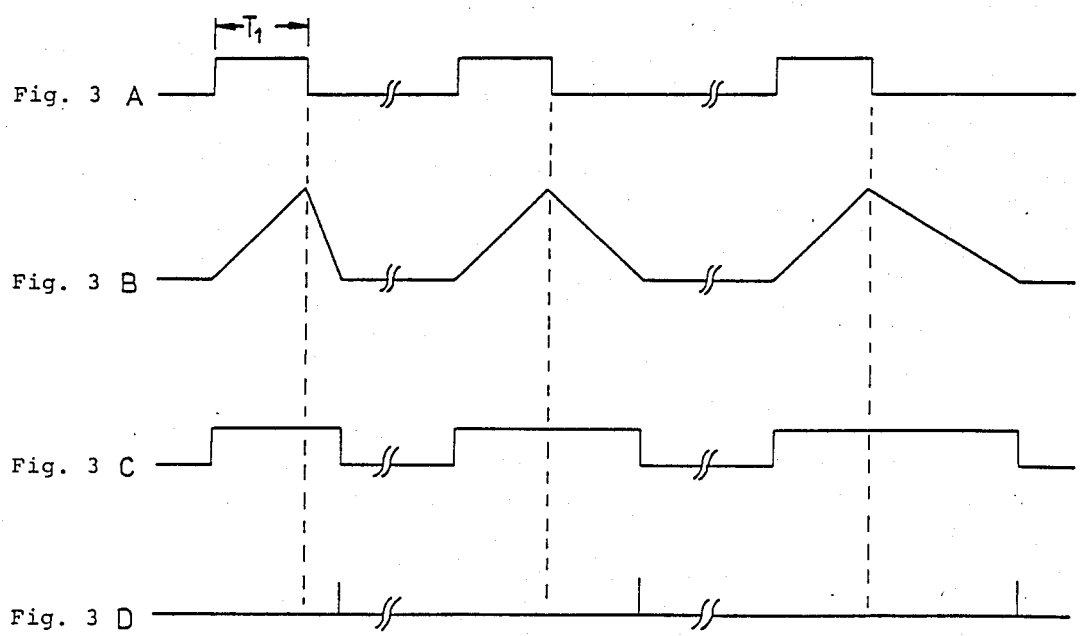

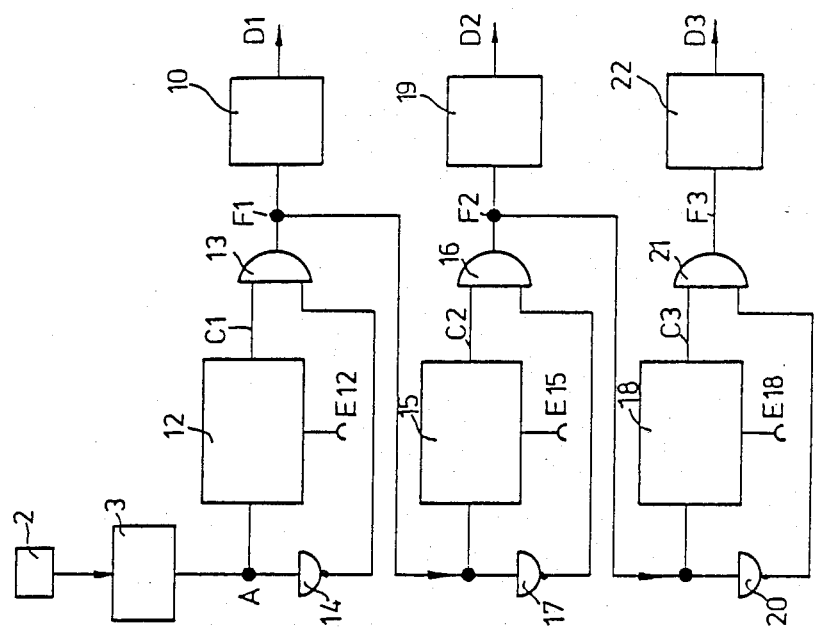
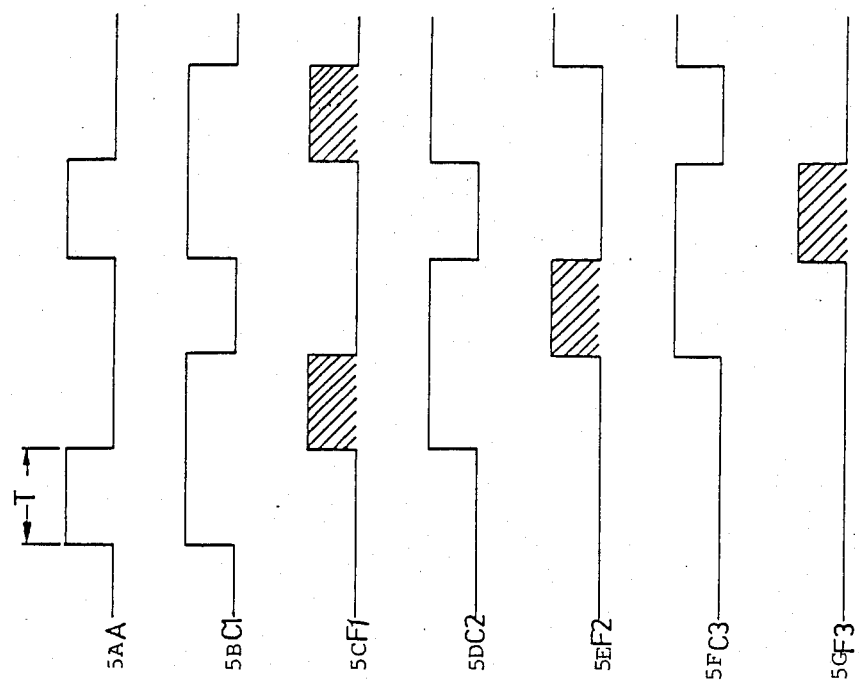
Fig.4

DIRECT CURRENT MOTOR COMMUTATION CONTROL

BACKGROUND OF THE INVENTION

The present invention relates to the control of coil commutation in d.c. motors.

Known electronically commutated D.C. motors are provided with several shaft position sensors, for example Hall elements, which are each associated with a set of coils. The sensors are arranged in a set spatial pattern related to the positions of the coils. Signals are generated in the sensors, for example by the rotation of a rotor having multipolar permanent magnets, by means of which the instantaneous rotor angular position is sensed. Each respective coil commutation is triggered by these signals.

In addition, such motors require a rotation speed signal generator supplying information, i.e. signals proportional to the motor rpm.

Both kinds of information are required in order to provide motor control by means of electronic circuits.

Motors are also known in which motor control is based on shaft position sensing by means of a light barrier cooperating with a plurality of bar codes distributed around the rotor in a set relationship with the commutatable coils.

BRIEF SUMMARY OF THE INVENTION

It is an object of the present invention to control the commutation of such a motor on the basis of signals provided by only one fixed, arbitrarily placed sensor.

Further features of the invention are described below.

In principle, during one revolution of the rotor, two items of information, from which the start of motor commutation is triggered, are derived from a pulse delivered by a sensor, for example a stationary light barrier cooperating with an obturator or window carried by the rotor shaft of the motor which is to be controlled. The first item of information is the time of the beginning of the pulse and is used to recognize the rotor angular position, while the second item of information is the duration of the pulse, which is dependent, for example, on the angular extent of the obturator or window opening cooperating with the light barrier and constitutes a measurement of the rate of rotor rotation.

In order to effect the start of commutation for a first set of coils based on these items of information, a first signal component is derived from the duration of the pulse, relating to the respective speed of rotation, and this component is extended by a second signal component generated in a circuit, at the end of which commutation is triggered. The second signal component is proportional to the first signal component, i.e. is linked with the first signal component by a selected proportionality factor K. The first and second components thus form a combined commutation timing control signal, at the end of it the commutation point is set.

When the motor starts, the actual duration of the first signal component is relatively long and the second signal component duration is also proportionally long since the angular speed of the rotor is correspondingly low. Therefore, the time for the start of the correct commutation is also correspondingly long. When the motor has reached its set speed, the angular speed is correspondingly high so that the duration of the first signal component is short and the duration of the second signal component, which is proportional to duration of the first signal component, is also short, so that the correct commutation point is reached sooner, based on the higher angular speed.

Linkage between the durations of the signal components is achieved by a proportionality factor K which is empirically determined for a motor based on the physical position of the sensor in relation to the coils. This factor can be fixed, for example, by setting in the motor a minimal current supply for the nominal rpm, whereby this factor must be find out empirically due to the data of the motor construction.

It is also possible to set this proportionality factor in such a way that at nominal rpm, maximum torque is delivered by the motor.

For motor control, i.e., the different operational states such as acceleration, braking and change of rotational direction, the factor can be changed accordingly, so that for these operational states, different starting points of commutation are obtained.

By means of the design so far described the initial start of commutation is determined. Commutation of the subsequent sets of coils can be done by a counter for example, or, in accordance to the invention, by cascading of a plurality of signal producing circuits each operating according to the principle thus far described. In this manner a commutation of successive sets of coils is triggered, starting at the end point of the second signal component, by cascading further signals generated proportionally to the actual duration of the combined signal at the respective end points of these signals. Control of such cascaded commutation point determinations can be performed by means of a microprocessor.

The invention is described below with reference to an exemplary embodiment illustrated in the drawings.

BRIEF DESCRIPTION OF THE DRAWINGS

FIGS. 2A to 2D show voltage curves at various points in FIG. 1 at differing motor speeds.

FIGS. 3A to 3D show, s in a manner analogous to FIGS. 2, voltage curves for differing commutation starting times associated with a given motor speed.

FIG. 4 is a block diagram of a circuit for the commutation of a plurality of sets of coils by cascading the circuit shown in FIG. 1.

FIGS. 5A to 5G are signal diagrams illustrating the signal waveforms at selected points in the circuit of FIG. 4.

DESCRIPTION OF THE PREFERRED EMBODIMENTS

Figure 1:
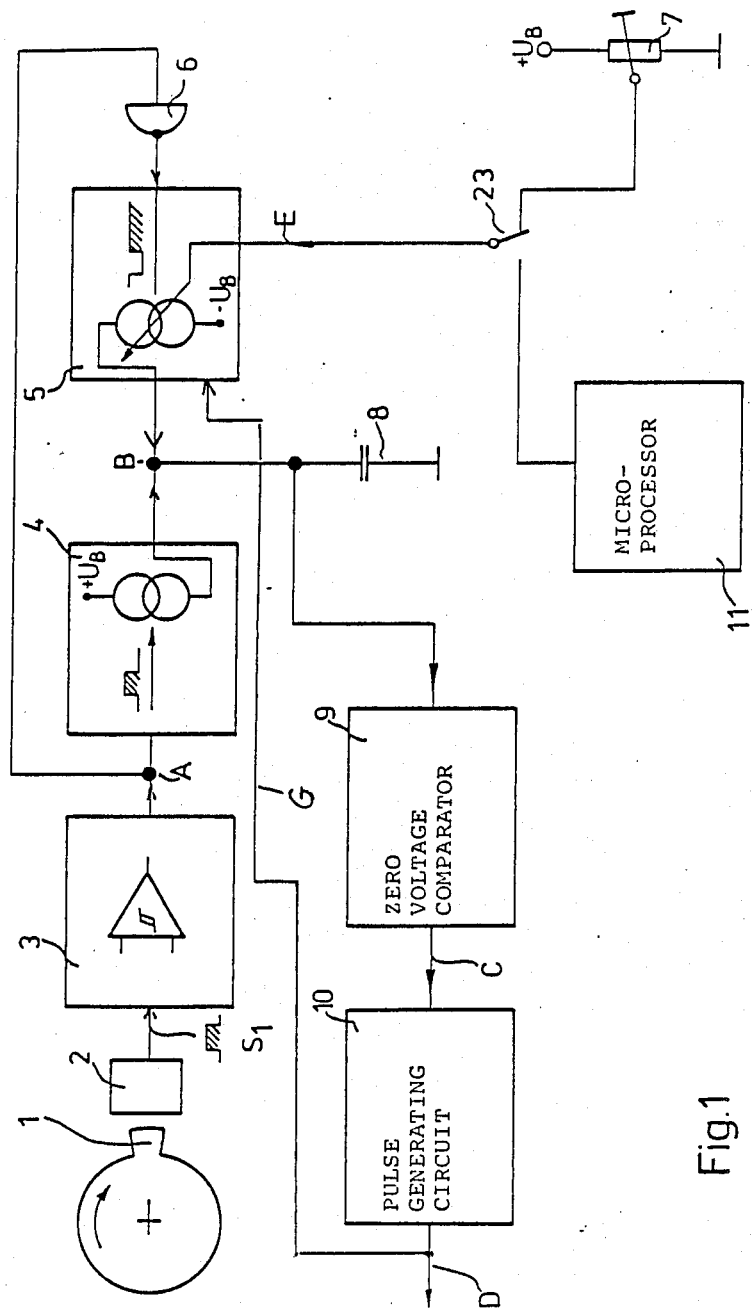
FIG. 1 is a block diagram of a circuit for controlling the commutation time of one coil set according to the invention.

In the form of a block diagram, FIG. 1 shows a rotation indicator 1 fastened on a motor shaft and cooperating with a sensor 2 to generate a signal S1. Elements 1 and 2 may be components of a Hall sensor, or a light beam sensor of the type described above, etc. The signal S1 has an actual signal length T1 dependent on the speed of rotation of the motor shaft and the angular extent of indicator 1 in case of, for example, a light barrier. T1 is long at low rpm and short at high rpm. A fixed angle has been preset by the spatial position of indicator 1 in relation to the motor coils (not shown) to be commutated. This angle can be freely chosen and can vary from one motor to another. Thus, the start of commutation, i.e. the time of switching from one set of coils to the next, is dependent on the angle determined from the start of the signal S1 to the optimal commutation point t2 desired.

To better understand the circuit, it is assumed that the actual signal length T1 of the signal S1 is shorter at the nominal rpm than the time from the start of the signal S1 to the commutation time t2. Thus, the commutation time t2 occurs in time after the period of the actual signal S1 and, for regular commutation, proportionally depends on the actual signal length T1 according to the formula:

$$t2 = T1 + K*T1$$

The proportionality factor K must be determined for each motor depending on the desired commutation time. Therefore, this factor can be set for the lowest current supply at nominal rpm or for the optimal torque at nominal rpm.

The signal S1 with the actual signal length T1 is transmitted from the sensor 2 to an amplifier 3. The output A of amplifier 3 controls a current source 4 and, via an inverter 6, an adjustable current sink 5. The outputs of current source 4 and current sink 5 are connected at a connecting point B which is connected to one side of a capacitor 8. Capacitor 8 is charged by the current source 4 during the period T1. Charging stops at the end of T1 and a discharge of the capacitor 8 is started via the current sink 5. The discharge process, i.e. the amplitude of current flow to current sink 5, can be set by a control signal applied via a control input E. The start of the charging of the capacitor 8 is sensed by a zero voltage comparator 9 connected across capacitor 8, the output C of which is switched to "high" at the start of charging. After capacitor 8 has been discharged to zero volts again via current sink 5, the output C of zero voltage comparator 9 changes to "low".

A pulse generating circuit 10 is connected to the output of zero voltage comparator 9 to produce a short duration pulse D at the instant when the output C switches from "high" to "low". Pulse D is used for the start of commutation of the first set of coils of the motor by triggering a conventional commutation circuit, not shown and is also used for stopping current sink 5 via connection Q.

In the active state, current source 4 provided for charging capacitor 8 supplies a constant current determined by the dimensions of source 4. However, current sink 5 used for discharging can be adjusted in respect to its current amplitude via its control connection E. A linear relationship applies between the current amplitude of current sink 5 and a DC control current supplied via a switch 23 at the control connection E. This DC control current is diverted from the service voltage $+U_B$ by means of a potentiometer 7, whereby the amplitude of the diverted voltage depends of the respective geometrical disposition of the sensor 2 on the basis of the coils of the motor to be commutated, as well as from the charging current of the current source 4. As already mentioned, the voltage at the control connection E can be set empirically to the lowest current at nominal motor rpm or to a maximum torque.

If the input E to current sink 5 is connected with the output of a microprocessor 11 via switch 23, varying operational states of the motor can be set with the aid of the microprocessor, which is equipped with a D/A converter. In this way it is possible, for example, to set right-hand rotation, left-hand rotation, acceleration and braking by providing a microprocessor output value which appropriately adjusts the commutation point, Commutation of the other coil sets of the motor can be effected by means of counter circuits, beginning with the start of the commutation of the first coil set described, or by means of cascading, as will be described with reference to FIGS. 4 and 5. In the circuit shown in FIG. 1, the commutation point t2 is set by conversion of the first signal component of length T1 and the second signal component of length K·T1 generated proportionally to the first signal component length T1, by charging and discharging operations of capacitor 8. However, it is also possible to convert these signal lengths into fixed frequency pulse trains and to determine the commutation point by means of counter circuits.

FIGS. 2A to 2D show the voltage waveforms at selected points in FIG. 1 at varying rpm of a motor. Three different rpm are shown such as may occur, for example, in motor control by means of a frequency generator. Viewed from left to right, progressively lower speeds are depicted. The Figure designations A, B, C and D correspond to like-designated points shown in FIG. 1.

FIG. 2A shows the voltage curve at the output of pre-amplifier 3. This voltage curve corresponds to the signal S1 with a length, or period, T1. FIG. 2B shows the voltage across capacitor 8 during the charging and discharging operations. During the time T1 the capacitor is charged with a constant current, and following the charging operation an immediate discharge takes place through current sink 5. The rate of discharge is preset by the control DC voltage which is fixedly set to point E in FIG. 1 for an optimal commutation operation by means of potentiometer 7. It can be seen that the ratio between charging and discharging times is always the same (in this case 2:3).

The signal waveform at the output of zero voltage comparator 9 is shown in FIG. 2C. At the start of charging, the zero voltage comparator switches to "high" and at the end of discharge, i.e. at the zero volt mark, the comparator switches to "low". The duration of each output pulse from comparator 9 is equal to t2.

FIG. 2D shows the timing of the trigger pulse at the output of pulse generating circuit 10 which is triggered at the end of the discharging operation in order to start commutation and to stop discharging.

FIGS. 3A to 3D show analogously to FIGS. 2 the voltage curves at points A, B, C and D in FIG. 1 for a constant motor speed and for control of respectively different operational modes. Commutation, i.e. the triggering of the pulse D, is changed by varying the rate of discharge of capacitor 8, by means of which varying operational modes, such as acceleration, braking, or changes in the direction of rotation can be set. Three variations shown in FIG. 3B. The varying discharge of the capacitor 8 is produced, for example, by the microprocessor 11 which is connected with the input E via the switch 23.

FIG. 4 is a block diagram for the commutation of several coil sets by cascading the circuit shown in FIG. 1. Each of the blocks 12, 15 and 18 contains a respective set of the circuit blocks 4, 5, 6, 8 and 9 shown in FIG. 1.

Sensor 2 supplies the signal S1 of length T1 via the amplifier 3 to the input of block 12 and simultaneously to the input of an inverter 14. The outputs of block 12 and inverter 14 are routed to an AND circuit 13 which supplies a signal F1 to pulse generator 10, causing generator 10 to emit a trigger signal D1 for a first coil set to be commutated at the end of each pulse of signal F1.

The output signal F1 of circuit 13, which is switched to "high" at the end of T1, arrives at the input of the further block 15 as well as the input of an inverter 17, and the outputs thereof are routed to a further AND circuit 16, by means of which the trigger pulse D2 for commutating a second coil set is triggered by the action of pulse generating circuit 19.

The output signal F2 of circuit 16, which is switched to "high" when the zero volt mark of the capacitor in block 15 has been attained, is now routed to further block 18 and to a further inverter 20 for commutation of a third coil set by means of pulse D3 produced by an AND circuit 21 and a pulse generating circuit 22.

Circuits 19 and 22 are each identical to circuit 10.

While commutation of three coil sets is shown in FIG. 4, additional circuit units can be provided to permit adaptation to a larger number of coil sets, The individual operational points for the blocks 12, 15 and 18, i.e. the control voltages at the block inputs E12, E15 and E18, must be set such that a continuous sequence of commutation pulses is guaranteed for the individual coil sets.

In addition to the block diagram of FIG. 4, the voltage curves which occur are shown with their associated designations in FIGS. 5A to 5G.

It is to be understood that preferred embodiments have been described herein by way of example only and that improvements and variants are possible within the scope of the invention.

What is claimed is:

1. A method for controlling commutation of coil sets of a direct current motor with a fixed sensor, in which a sensor signal, S1, having a first period, T1, related to the speed of rotation of the motor rotor is generated during each revolution of the rotor, comprising the steps of: producing a control signal having a period equal to the sum of the first period, T1, and a second period, $T2 = K*T1$, where K is a selected proportionality factor; and at the end of the period of the control signal, starting commutation of a first one of the coil sets.

2. A method as defined in claim 1 wherein the porportionality factor between the second and first periods is adjusted for an optimal start of the commutation.

3. A method as defined in claim 1 further comprising the step of, during running of the motor, varying the proportionality factor between the second and first periods to correspond to different operational states.

4. A method as defined in claim 3 wherein the different operational states include acceleration, braking and charge of rotational direction.

5. A method as defined in claim 3 wherein the value of the proportionality factor between the second and first periods is controlled by means of a microprocessor.

6. A method as defined in claim 1 further comprising the step of controlling the start of commutation of further coil sets starting from the end of the control signal period by cascading additional signals each having a period proportional to the first period.

7. A method as defined in claim 6 wherein the periods of the additional signals are controlled by a microprocessor.

8. An arrangement for controlling commutation of coil sets of a direct current motor with a fixed sensor, in which a sensor signal (S1) having a first period (T1) related to the speed of rotation of the motor rotor is generated during each revolution of the rotor, comprising: control signal producing means connected to the sensor for producing a control signal having a period equal to the sum of the first period (T1) and a second period (T2) proportional to the first period (T1); and commutation initiating means connected to said control signal producing means for starting commutation of a first one of the coil sets at the end of the period of the control signal.

9. An arrangement as defined in claim 8 wherein the proportionality between the second and first periods is set for an optimal start of the commutation.

10. An arrangement as defined in claim 8 further comprising control means connected to said commutation initiating means for varying the proportionality between the second and first periods to correspond to different operational states during running of the motor.

11. An arrangement as defined in claim 10 wherein the different operational states include acceleration, braking and change of rotational direction.

12. An arrangement as defined in claim 11 wherein said control means comprise a microprocessor connected for controlling the value of the proportionality between the second and first periods.

13. An arrangement as defined in claim 8 further comprising means cascaded with said commutation initiating means for generating additional signals, each having a period proportional to the first period, in order to control the start of commutation of further coil sets starting from the end of the control signal period.

14. An arrangement as defined in claim 13 further comprising a microprocessor connected for controlling the periods of the additional signals.

* * * * *